United States Patent [19]

Salyer et al.

[11] 3,799,355

[45] Mar. 26, 1974

[54] DIALYSIS MEMBRANES AND MANUFACTURE

[75] Inventors: Ival O. Salyer; Donald D. Bump, both of Dayton, Ohio; William E. Weesner, Alexandria, Va.

[73] Assignee: The United States of America as represented by the Secretary of the Department of Health, Education and Welfare, Washington, D.C.

[22] Filed: Dec. 28, 1970

[21] Appl. No.: 102,092

[52] U.S. Cl. ................... 210/500, 264/182, 264/206
[51] Int. Cl. ............................................ B01d 31/00
[58] Field of Search .............. 210/22, 23, 321, 500; 264/41, 49, 182, 206

[56] References Cited
UNITED STATES PATENTS

| | | | |
|---|---|---|---|
| 3,615,024 | 10/1971 | Michaels | 210/500 X |
| 3,567,810 | 3/1971 | Baker | 210/500 X |
| 3,546,209 | 12/1970 | Lipps, Jr. | 210/321 X |
| 3,423,491 | 1/1969 | McLain et al. | 264/49 |
| 3,441,142 | 4/1969 | Oja | 210/321 |

OTHER PUBLICATIONS

Leininger, et al, "Preparation of Nonthrombogenic Plastic Surfaces," from Trans. Amer. Soc. Artif. Int. Organs, Vol. XII, pp. 151–154 Relied on.

Markle et al., "Development of Improved Membranes for Artificial Kidney Dialysis," from Trans. Amer. Soc. Artif. Int. Organs, Vol. X, pp. 22–25 Relied on.

Primary Examiner—Frank A. Spear, Jr.

[57] ABSTRACT

Non-thrombogenic hemodialysis flat membranes useful in artificial kidneys are prepared from quaternized membranes of polymers made from monomeric substances of which at least a sufficient amount of a vinylpyridine is included to provide membranes which on heparinization are non-thrombogenic particularly polymers made from monomeric substances of which from 2 to 10 percent by weight of the total monomer is a vinylpyridine and at least 80 percent by weight is acrylonitrile. Both copolymers and blends of polymers can be used. A novel process is described for making the quaternized membranes.

5 Claims, No Drawings

DIALYSIS MEMBRANES AND MANUFACTURE

BACKGROUND OF THE INVENTION

The invention described herein was made in the course of, or under, a contract with the Department of Health, Education, and Welfare.

1. Field of the Invention

The invention relates to liquid purification and separation, and especially to semipermeable membranes and is useful in the dialysis art and especially in the hemodialysis or artificial kidney art.

2. Description of the Prior Art

Non-thrombogenic, permeable membranes useful for artificial kidneys are described in U.S. Pat. No. 3,441,142. The non-thrombogenic membranes of this patent are made from membranes having hydroxyl groups by converting at least a portion of the hydroxyl groups to oxy alkali metal groups, then reacting with a haloalkyl dialkyl amine, then quaternizing by reacting with an alkyl halide and finally reacting with an alkali metal salt of an anti-thrombogenic compound such as heparin.

SUMMARY OF THE INVENTION

Non-thrombogenic hemodialysis flat membranes useful in artificial kidneys are prepared from quaternized membranes of polymers of monomeric substances of which at least a sufficient amount of a vinylpyridine is included to provide membranes which on heparinization are non-thrombogenic, particularly polymers made from monomeric substances of which from 2 to 10 percent by weight of the total monomer is a vinylpyridine and at least 80 percent is acrylonitrile. The term "flat" is used in this application to distinguish from "hollow-fibre" with reference to membranes. It should be noted that all percentages in this application including the claims are by weight unless otherwise stated. Both copolymers and blends of polymers can be used. A novel process is described for making the quaternized membranes and preserving the porosity of these membranes. Copolymer blends of acrylonitrile and methylvinylpyridine copolymer with copolymers of acrylonitrile and vinyl acetate are especially suitable.

DESCRIPTION OF THE PREFERRED EMBODIMENTS

Copolymers and copolymer blends of acrylonitrile and a vinylpyridine together with minor proportions of other comonomers polymerizable therewith are described in U.S. Pat. No. 2,613,194; however, it is not necessary to use the sulfuric acid as in the patent when making the flat membranes. As has been stated, useful polymers are both blends and copolymers per se which are comprised of at least a sufficient amount of a vinylpyridine in the monomer mixture to give a quaternized membrane which when heparinized is non-thrombogenic based on in vitro or in vivo tests accepted in the art, e.g. a test comparable to that described in copending application Ser. No. 39,858, filed May 20, 1970, now U.S. Pat. No. 3,655,815, issued Apr. 11, 1972, Example 2, page 9 et seq; particularly the blends and copolymers per se are comprised of from 2 to 10 percent of a vinylpyridine including alkyl-substituted vinylpyridine, said percentage being based on the total monomers of which the copolymer or blend of copolymers are comprised. The preferred blend can have as a principal polymer from 50 to 98 percent of a copolymer of 90 percent or more acrylonitrile and minor proportions of monomers copolymerizable therewith. The other blend constituent is a polyvinyl pyridine or a copolymer of 30 or more percent up to 70 percent of a vinylpyridine and up to 70 percent of another copolymerizable monomer. The two components of the blended copolymers are proportioned such as to provide the required quantity of acrylonitrile and reactive vinylpyridine. Although copolymer blends are especially suitable a copolymer per se of acrylonitrile and a vinylpyridine having at least about 50 percent acrylonitrile therein, particularly a copolymer of 90 to 98 percent acrylonitrile and from 2 to 10 percent of a vinylpyridine can be used.

The vinylpyridine in both the copolymers and blend copolymers can be any vinylpyridine or alkyl-substituted vinylpyridine, for example, 2-vinylpyridine, 3-vinylpyridine, 4-vinylpyridine, 2-vinyl-4-ethylpyridine, 2-vinyl-3-methylpyridine, 5-vinyl-2-methylpyridine, 2-vinyl-5-ethylpyridine, 2-vinyl-4-methylpyridine, 3-vinyl-5-ethylpyridine and any other vinylpyridine containing alkyl substituents wherein the alkyl radical has up to four carbon atoms.

The copolymers can have in addition to the functional components, acrylonitrile and a vinylpyridine, one or more other components derived from monomers such as vinyl acetate and other vinyl esters of carboxylic acids having up to four carbon atoms, vinyl chloroacetate, methyl methacrylate, methyl acrylate and other alkyl acrylates and alkyl methacrylates wherein the alkyl radical has up to four carbon atoms, diethyl maleate, diethyl fumarate and other alkyl maleates and fumarates wherein the alkyl radical has up to four carbon atoms, styrene and other vinyl-substituted aromatic hydrocarbons, vinylidene chloride and methacrylonitrile. These non-functional monomers can be present as a third monomer with acrylonitrile and a vinylpyridine in a terpolymeric system, or they can be used in the blended composition either as a comonomer with acrylonitrile in the principal polymer or as a comonomer with a vinylpyridine in the blending polymer.

Suitable quaternizing agents are alkyl halides such as methyl bromide, methyl chloride, methyl iodide, ethyl bromide, etc. Others that may be employed include straight and branch chained primary alkyl, alkenyl, cycloalkyl alkyl, and aralkyl chlorides, bromides and iodides having from one to about 10 carbon atoms in the molecule, e.g. benzyl chloride. All of the above-named halides are aliphatic halides and are so defined.

A preferred solvent is N,N-dimethylacetamide but other solvents such as the following can be used to prepare the copolymer blends, namely butyrolactone, N,N-dimethylformamide, ethylene carbonate, maleic anhydride, N,N-dimethyl methoxy acetamide, succinic anhydride, dimethyl sulfoxide and alpha-cyanoacetamide.

A particularly suitable copolymer blend for use in making the membranes of the invention is a blend of a 95 percent acrylonitrile and 5 percent vinyl acetate copolymer with a 50 percent acrylonitrile and 50 percent methylvinylpyridine copolymer in a ratio of 88:12, respectively, of the copolymers in the blend.

Flat membranes having a high rate of urea, uric acid and creatinine transport and rapid ultrafiltration of water can be prepared from solutions of the polymer blend mentioned in the previous paragraph. A solution is made of this polymer in dimethyl acetamide in a concentration of about 10 to 25 percent by weight and about 0.0633 grams of benzyl chloride per gram of polymer is added to the solution. A film is cast on a glass plate and is allowed to dry for about 5 minutes, the film is quenched by plunging into water, or other coagulant, and a film of good porosity is obtained. The pores are large enough to pass low molecular weight, blood urea nitrogen and water, but sufficiently small that they do not pass high molecular weight blood proteins or blood cells. Alternatively, the quaternization can be carried out subsequent to the formation of the membrane by treating the membrane with benzyl chloride.

Membranes of 3 to 4 mil thickness are made having urea permeability in the range of 0.005 to 0.075 ml./min. and ultrafiltration rates in the range of 3 to 300 ml./min./m² at 25 mm. Hg. transmembrane pressure. Adusting the drying time in the range of about 1 to 60 minutes and coagulation conditions with water or other non-solvent can be used to adjust the surface skin and porosity of the membranes, and by adjusting these and other process conditions membranes having higher or lower urea transport and ultra-filtration rates outside the ranges specified above can be obtained. Heparinization of the flat membranes can be carried out as described in U.S. Pat. No. 3,441,142, column 5, line 26 et seq. as well as in the experimental examples of this patent; heparinization can be carried out prior to the formation of the membrane by heparinizing the polymer in solution, but since heparin type materials are so expensive, it is preferred to carry out the heparinization of the membrane itself treating only the membrane surface which will contact blood.

Although the invention has been described in terms of specified embodiments which are set forth in considerable detail, it should be understood that this is by way of illustration only and that the invention is not necessarily limited thereto since alternative embodiments and operating techniques will become apparent to those skilled in the art in view of the disclosure. Accordingly, modifications are contemplated which can be made without departing from the spirit of the described invention.

What is claimed is:

1. A process for making flat asymetric hemodialysis membranes comprising the following steps:
   a. casting the membrane on a smooth plane surface from a solution in a solvent of a polymer made from monomeric substances of which at least a sufficient amount of a vinylpyridine is included to provide membranes which on heparinization are non-thrombogenic, at least 50 percent is acrylonitrile and a quaternizing agent,
   b. partially air drying to form a polymer film, and
   c. coagulating the film to form the membrane by emersion in a non-solvent for the polymer.

2. A process of claim 1 wherein the solvent is dimethyl acetamide.

3. A process of claim 1 wherein the non-solvent is water.

4. A process of claim 1 wherein the quaternizing agent is benzyl chloride.

5. The hemodialysis membrane produced by the process of claim 1.

* * * * *